(12) United States Patent
Sebire

(10) Patent No.: US 10,506,423 B2
(45) Date of Patent: *Dec. 10, 2019

(54) METHOD AND APPARATUS FOR IDENTIFYING CLOSED SUBSCRIBER GROUP CELLS

(71) Applicant: Nokia Technologies Oy, Espoo (FI)

(72) Inventor: Guillaume Sebire, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/347,238

(22) Filed: Nov. 9, 2016

(65) Prior Publication Data

US 2017/0118627 A1    Apr. 27, 2017

Related U.S. Application Data

(63) Continuation of application No. 13/696,973, filed as application No. PCT/IB2011/052078 on May 11, 2011, now Pat. No. 9,532,298.

(Continued)

(51) Int. Cl.
*H04W 4/00* (2018.01)
*H04W 8/18* (2009.01)
(Continued)

(52) U.S. Cl.
CPC ............. *H04W 8/186* (2013.01); *H04W 8/26* (2013.01); *H04W 12/08* (2013.01); *H04W 24/10* (2013.01);
(Continued)

(58) Field of Classification Search
CPC .... H04W 84/045; H04W 24/10; H04W 36/08
See application file for complete search history.

(56) References Cited

U.S. PATENT DOCUMENTS 9,432,893 B2    8/2016  Ishida et al.
2008/0267153 A1  10/2008  Mukherjee et al.
(Continued)

FOREIGN PATENT DOCUMENTS

WO    WO-2009022976 A1    2/2009
WO    WO-2009043002 A3    7/2009
(Continued)

OTHER PUBLICATIONS

Huawei Technologies Co. Ltd., "CSG cell identification for measurement reporting," 3rd Generation Partnership Project, 3GPP TSG GERAN #38, Agenda Item 7.1.5.2,7.2.5.3.3, May 12-16, 2008.
(Continued)

*Primary Examiner* — Omoniyi Obayanju
(74) *Attorney, Agent, or Firm* — Mintz Levin Cohn Ferris Glovsky and Popeo, P.C.

(57) ABSTRACT

A method, apparatus and computer program product are provided for identifying a closed subscriber group (CSG) cell to a macrocell in an efficient manner such that the identification of the CSG cell requires less signalling between the mobile terminal and the macrocell, thereby either reducing the overall signalling or providing increased capacity for additional measurement reporting by the mobile terminal. Additionally, a method, apparatus and computer program product are provided in which the CSG cell is identified in a more efficient manner in a cell change order, thereby similarly reduce the signalling requirements between a macrocell and a CSG cell.

18 Claims, 6 Drawing Sheets

Related U.S. Application Data

(60) Provisional application No. 61/333,532, filed on May 11, 2010.

(51) Int. Cl.

| | | |
|---|---|---|
| *H04W 48/02* | (2009.01) | |
| *H04W 24/10* | (2009.01) | |
| *H04W 48/16* | (2009.01) | |
| *H04W 12/08* | (2009.01) | |
| *H04W 8/26* | (2009.01) | |
| *H04W 24/02* | (2009.01) | |
| *H04W 84/04* | (2009.01) | |

(52) U.S. Cl.
CPC .......... *H04W 48/02* (2013.01); *H04W 48/16* (2013.01); *H04W 24/02* (2013.01); *H04W 84/045* (2013.01)

(56) References Cited

U.S. PATENT DOCUMENTS

| | | |
|---|---|---|
| 2009/0239533 A1 | 9/2009 | Somasundaram et al. |
| 2009/0270096 A1 | 10/2009 | Somasundaram et al. |
| 2010/0113009 A1 | 5/2010 | Jeong et al. |
| 2010/0240358 A1* | 9/2010 | Jen ............ H04W 36/385 455/424 |
| 2010/0278147 A1 | 11/2010 | Horn et al. |
| 2011/0105123 A1 | 5/2011 | Lee et al. |
| 2012/0021725 A1* | 1/2012 | Rune ............ H04W 48/16 455/411 |

FOREIGN PATENT DOCUMENTS

| | | |
|---|---|---|
| WO | WO-2009044318 A3 | 7/2009 |
| WO | WO-2009117658 A1 | 9/2009 |
| WO | WO-2009132572 A1 | 11/2009 |
| WO | WO-2009155576 A1 | 12/2009 |
| WO | WO-2011141883 A1 | 11/2011 |

OTHER PUBLICATIONS

Nokia Corporation, et al., "Supporting PCCO to CSG cells in Rel-9," 3rd Generation Partnership Project, 3GPP TSG GERAN #46, Agenda Item 7.2.5.2.2, May 17-21, 2010.

International Search Report dated Sep. 14, 2011, for PCT application No. PCT/IB2011/052078.

* cited by examiner

METHOD AND APPARATUS FOR IDENTIFYING CLOSED SUBSCRIBER GROUP CELLS

This application is a continuation of U.S. patent application Ser. No. 13/696,973, filed Nov. 8, 2012, entitled "METHOD AND APPARATUS FOR IDENTIFYING CLOSED SUBSCRIBER GROUP CELLS," which is a national stage application, filed under 35 U.S.C. § 371, of PCT Application No. PCT/IB2011/052078, filed May 11, 2011, entitled "METHOD AND APPARATUS FOR IDENTIFYING CLOSED SUBSCRIBER GROUP CELLS," which claims the benefit of U.S. Ser. No. 61/333,532, filed on May 11, 2010, entitled "METHOD AND APPARATUS FOR IDENTIFYING CLOSED SUBSCRIBER GROUP CELLS," the contents of each of which are incorporated herein by reference in their entireties.

TECHNOLOGICAL FIELD

Embodiments of the present invention relate generally to communications technology and, more particularly, relate to a method and apparatus for uniquely identifying a closed subscriber group cell within a macrocell.

BACKGROUND

Networking technologies including, for example, computer networks, television networks and telephony networks, continue to facilitate ease of information transfer and convenience to users. In order to provide easier and/or faster information transfer and convenience, telecommunication industry service providers are developing improvements to existing networks. In this regard, for example, improvements are being made to the universal mobile telecommunications system (UMTS) terrestrial radio access network (UTRAN). Further, for example, the evolved-UTRAN (E-UTRAN) is being developed. The E-UTRAN, which is also known as Long Term Evolution (LTE), is aimed at upgrading prior technologies by improving efficiency, lowering costs, improving services, making use of new spectrum opportunities, and providing better integration with other open standards.

Recently, efforts have been made to enable the provision of closed subscriber groups (CSGs) to enable restricted access to particular CSG cells for particular groups of subscribers. CSGs may be useful for particular organizations or businesses that wish to define a group of users that may be enabled to freely access a base station, node or access point associated with the CSG, but may have restrictions for enabling access to the cell by individuals outside of the group. CSGs may also be useful in connection with individually established networks within private homes. In this regard, for example, a CSG may typically define a group of users (e.g., subscribers) that are enabled to access a particular CSG cell. As such, individuals that are not members of the group may not be able to access the CSG cell. In some situations, subscribers may be members of multiple CSGs. In practice, a CSG may be associated with one or more cells served by access points, base sites, node-Bs or e-node-Bs that may provide access to subscribers of the CSC.

Current communication standards enable a particular user's mobile terminal to discover possible CSG cells with which the mobile terminal may attempt to communicate using an autonomous search procedure. Mobile terminals may also manually attempt to communicate with CSG cells. The mobile terminal is authorized to access CSG cells for which the CSG identity is within the mobile terminal's CSG "whitelist", that is, a list provided by non-access stratum containing all of the CSG identities of the CSGs to which the user of the mobile terminal belongs.

In operation, a mobile terminal may acquire the routing parameters and CSG ID of a CSG cell by reading system information blocks for the respective cell. Specifically, for a UTRAN CSG cell, the MIB and SIB1 may be acquired, while for an E-UTRAN CSG cell, the MIB and the SIB3 may be acquired. These routing parameters may include, for example, a tracking area identifier (TAI), a cell global identifier (CGI), a radio network controller identifier (RNC-ID) and/or the like. Based upon measurements of the signal strength or signal quality and other signalling parameters of the cells that are in communication with the mobile terminal, the mobile terminal may issue measurement reports to the macrocell so that the macrocell may make informed decisions as to the CSG cell to support subsequent communications with the mobile terminal.

CSG cells may be deployed in an uncoordinated manner within a macrocell with two or more CSG cells operating on the same frequency and sharing the same physical layer identity, such as a physical layer cell ID (PCI) in an E-UTRAN cell or a primary scrambling code (PSC) in a UTRAN cell. Thus, the macrocell and the mobile station may not be able to uniquely identify a CSG cell based solely on its physical layer identity and the frequency on which the CSG cell operates, thereby leading to PSC or PCI confusion. As such, the cell global identifier (CGI) may be utilized to uniquely identify the CSG cell, not only within the macrocell, but also more globally within the network. Thus, in making measurement reports to the macrocell, mobile terminals may identify the CSG cells by their CGI and, in some instances, with additional identifiers. Similarly, a macrocell could include the CGT of a CSG cell in a cell change order so as to uniquely identify the target cell to which the mobile terminal should transition. However, the CGI is relatively sizable, such as 28 bits, and therefore consumes an undesirably large portion of the measurement reports, thereby disadvantageously limiting the quantity of other information that may be transmitted in the measurement reports. Similarly, the CGI undesirably increases the size of a cell change order, thereby requiring that additional data be transferred between the macrocell and a CSG cell.

As such, it would be desirable to provide an improved technique for identifying CSG cells in a more efficient manner such that the identification of CSG cells consumes a smaller percentage of the signalling between a mobile terminal and a macrocell.

BRIEF SUMMARY

A method, apparatus and computer program product are provided according to one example embodiment for identifying a closed subscriber group (CSG) cell to a macrocell in an efficient manner such that the identification of the CSG cell requires less signalling between the mobile terminal and the macrocell, thereby either reducing the overall signalling or providing increased capacity for additional measurement reporting by the mobile terminal. Additionally, a method, apparatus and computer program product are provided according to another embodiment in which the CSG cell is identified in a more efficient manner in a cell change order, thereby similarly reducing the signalling requirements between a macrocell and a CSG cell, for example.

In one example embodiment, a method is provided for receiving an indication that a CSG cell has been detected and then generating an identifier for the CSG cell. The identifier may be caused to be transmitted to a macrocell in association with a physical layer identity and a frequency of the CSG cell, thereby uniquely identifying the CSG cell as between a respective mobile terminal and the macrocell while the identifier is valid.

In another example embodiment, an apparatus is provided that includes at least one processor and at least one memory storing computer program code. The at least one memory and the storage computer program code are configured, with the at least one processor, to cause the apparatus to at least receive an indication that a CSG cell has been detected, generate an identifier for the CSG cell and cause the identifier to be transmitted to a macrocell in association with the physical layer identity and the frequency of the CSG cell.

In accordance with a further example embodiment, a computer program product is provided that includes at least one computer-readable storage medium having computer-readable program instructions stored therein. The computer-readable program instructions may include program instructions configured to receive an indication that a CSG cell has been detected and program instructions configured to generate an identifier for the CSG cell. The computer-readable program instructions may also include program instructions configured to cause the identifier to be transmitted to a macrocell in association with a physical layer identity and the frequency of the CSG cell.

An apparatus also provided in accordance with another example embodiment that includes means for receiving an indication that a CSG cell has been detected, means for generating an identifier for the CSG cell and means for causing the identifier to be transmitted to a macrocell in association with a physical layer identity and the frequency of the CSG cell.

In accordance with another example embodiment, a method is provided that receives measurement reports for each of a plurality of CSG cells having a common physical layer identity and a common frequency within a macrocell. The measurement reports identify the respective CSG cells by an identifier in association with the physical layer identity and the frequency at which a CSG cell operates. The identifier serves to uniquely identify the respective CSG cell as between the mobile terminal issuing the measurement report and the macrocell as long as the identifier is valid, but not more globally within a network nor between the network and another mobile terminal. The method of this example embodiment also causes a cell change order to be issued that identifies the target CSG cell by the respective identifier in association with the physical layer identity and the frequency.

In yet another example embodiment, an apparatus is provided that includes at least one processor and at least one memory storing computer program code. The at least one memory and the stored computer program code may be configured, with the at least one processor, to cause the apparatus to at least receive measurement reports for each of a plurality of CSG cells having a common physical layer identity and a common frequency within a macrocell. The measurement reports may identify the respective CSG cell by an identifier in association with the physical layer identity and the frequency that serves to uniquely identify the respective CSG cell as between the mobile terminal issuing the measurement report and the macrocell as long as the identifier is valid, but not more globally within a network nor between the network and another mobile terminal. The at least one memory and the stored computer program code may also be configured, with the at least one processor, to cause the apparatus to cause a cell change order to be issued that identifies the CSG cell by the respective identifier in association with the physical layer identity and the frequency.

In a further example embodiment, a computer program product is provided that includes at least one computer-readable storage medium having computer-readable program instructions stored therein. The computer-readable program instructions may include program instructions configured to receive measurement reports for each of a plurality of CSG cells having a common physical layer identity and a common frequency within a macrocell. The measurement reports may identify the respective CSG cell by an identifier in association with the physical layer identity and the frequency that uniquely identify the respective CSG cell as between the mobile terminal issuing the measurement report and the macrocell as long as the identifier is valid, but not more globally within a network nor between the network and another mobile terminal. The computer-readable program instructions may also include program instructions configured to cause a cell change order to be issued that identifies the CSG cell by the respective identifier in association with the physical layer identity and the frequency.

In a still further example embodiment, an apparatus is provided that includes means for receiving measurement reports for each of a plurality of CSG cells having a common physical layer identity and a common frequency within a macrocell. The measurement reports may identify the respective CSG cell by an identifier in association with the physical layer identity and the frequency so as to uniquely identify the respective CSG cell as between the mobile terminal issuing the measurement report and the macrocell as long as the identifier is valid, but not more globally within the network nor between the network and another mobile terminal. The apparatus of this embodiment may also include means for causing a cell change order to be issued that identifies the CSG cell by the respective identifier in association with the physical layer identity and the frequency.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
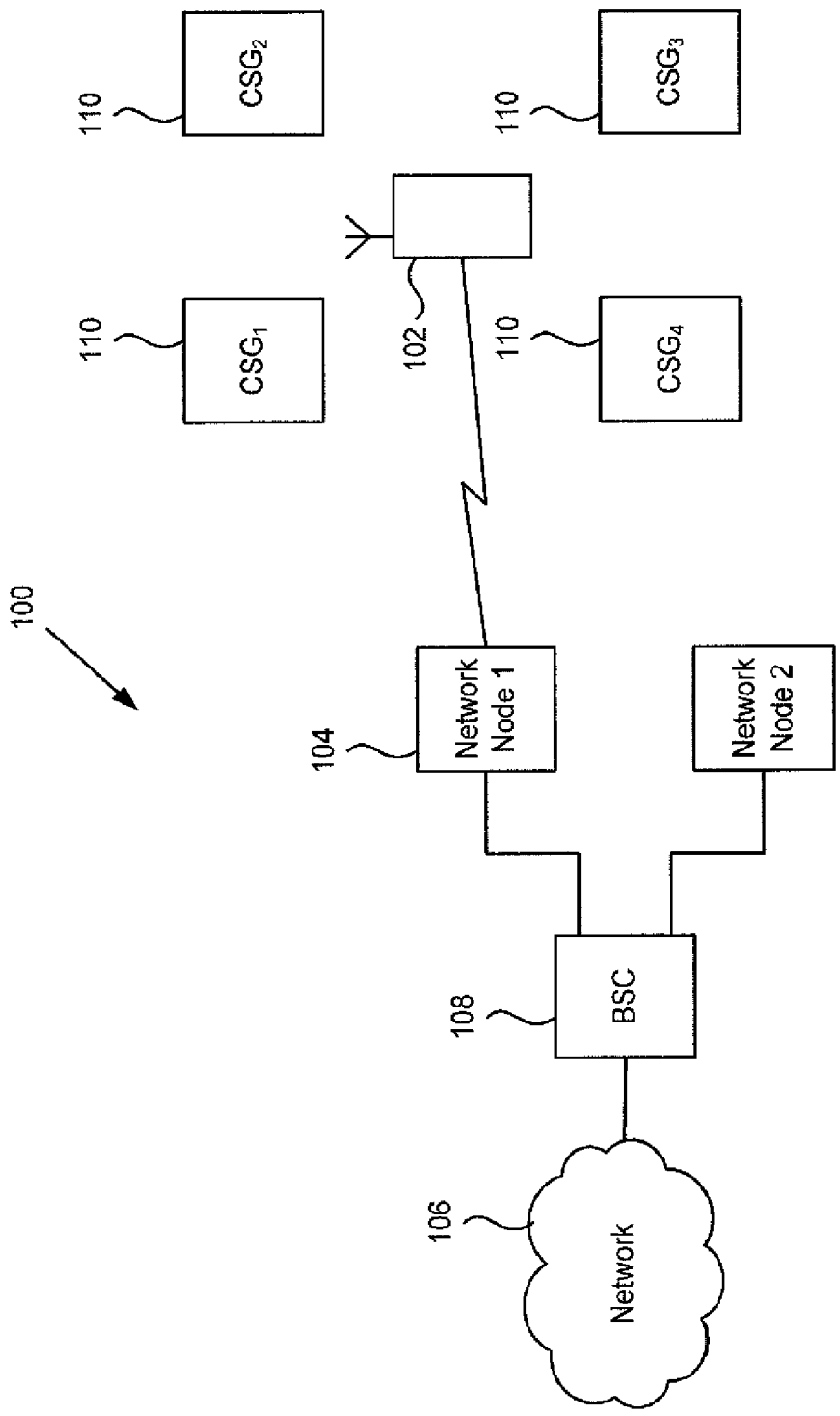
FIG. 1 illustrates a system having a plurality of closed subscriber group (CSG) cells within a macrocell in accordance with one example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Example embodiments of the present invention may relate to the unique identification of a closed subscriber group (CSG) cell as between a respective mobile terminal and a macrocell, and, in particular, to the identification of a CSG cell in a manner that conserves or reduces the signalling required to identify the CSG cell. Thus, a mobile terminal may identify a CSG cell within a measurement report to a macrocell with the efficient representation of the identity of the CSG cell permitting additional measurement information to be included within the report. Similarly, a macrocell may issue a cell change order that identifies a CSG cell in such a manner that signalling resources are conserved as a result of the efficient representation of the identity of the CSG cell in accordance with one example embodiment of the present invention. For example, a CSG cell may be identified by an abbreviated identifier that uniquely identifies the CSG cell as between the respective mobile terminal and a macrocell, even though the abbreviated identifier may not uniquely identify the CSG cell on a global basis throughout the network or between the network and another mobile terminal. However, for purposes of communications between the respective mobile terminal and the macrocell, such as the issuance of measurement reports and cell change orders, the unique identification of a CSG cell as between the respective mobile terminal issuing a measurement report and the macrocell issuing a cell change order is sufficient, regardless of whether the CSG cell is uniquely identified on a global basis within the network or not.

The method, apparatus and computer program product of an example embodiment may be employed in conjunction with a variety of networks that include one or more macrocells and a plurality of CSG cells. For example, FIG. 1 illustrates a block diagram of a system 100 for identifying the CSG cells within a macrocell according to an example embodiment of the present invention. It will be appreciated that the scope of the invention encompasses many potential embodiments in addition to those illustrated and described herein. As such, while FIG. 1 illustrates one example of a configuration of a system for identifying a CSG cell within a macrocell, numerous other configurations may also be used to implement embodiments of the present invention. In at least some embodiments, the system 100 includes one or more mobile terminals 102 and one or more network nodes 104 for defining respective macrocells for supporting communications with the mobile terminals. In at least some embodiments, the system further comprises a network 106. The network may comprise one or more wireline networks, one or more wireless networks, or some combination thereof. In one embodiment, the network comprises a public land mobile network (e.g., a cellular network), such as may be implemented by a network operator (e.g. a cellular access provider). The network may operate in accordance with UTRAN standards, E-UTRAN standards, GSM (Global System for Mobile communications) EDGE (Enhanced Data Rates for GSM Evolution) radio access network (GERAN) standards and/or the like. It will be appreciated, however, that where references herein are made to a network standard and/or terminology particular to a network standard, the references are provided merely by way of example and not by way of limitation.

The network node 104 may comprise any network entity configured to communicate with a mobile terminal 102, such as to support the establishment of a connection with the mobile terminal to the network node. In this regard, the network node may comprise, for example, a base station (BS), such as a base transceiver station in accordance with the GERAN standard. In one embodiment, the network node may comprise a base station subsystem (BSS) for handling traffic and signalling between a mobile terminal and the network switching subsystem. As such, in some embodiments, the network node is configured to provide access to the network 106 for the mobile terminal. In this regard, the system 100 may also include a base station controller (BSC) 108 that at least partially controls the operations of one or more network nodes and that facilitates communication between the network nodes and the network.

In addition to the network nodes 104, the mobile terminal 102 may also establish communications with one or more CSG cells 110, four of which are designated as $CSGCell_1$, $CSGCell_2$, $CSGCell_3$ and $CSGCell_4$ in the embodiment of FIG. 1. For example, the CSG cells may be defined by respective home node Bs for which the mobile terminal may have access rights and with which the mobile terminal may therefore communicate. As shown, each of the four example CSG cells may be within the coverage area of the macrocell, such as a GERAN cell.

Figure 2:
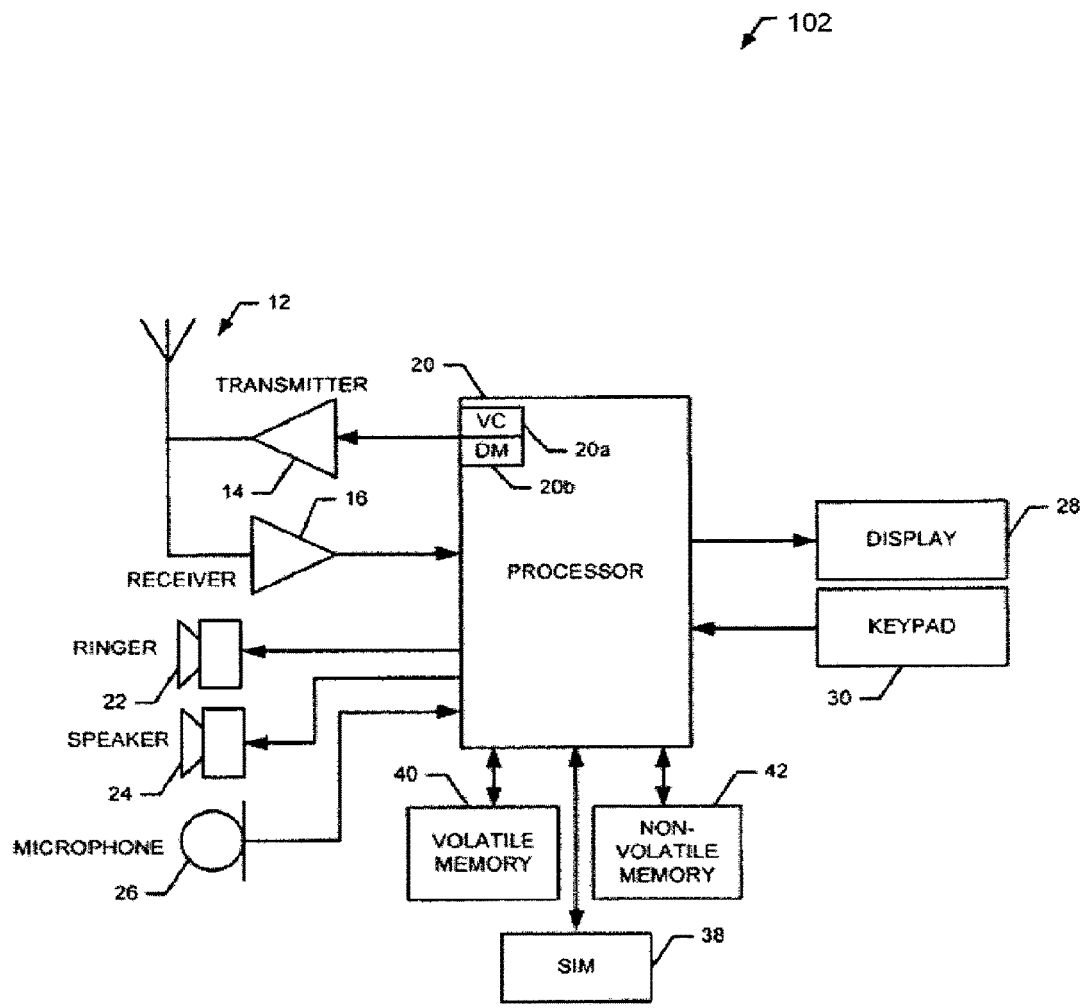
FIG. 2 is a block diagram of a mobile terminal according to one example embodiment of the present invention.

The mobile terminal 102 may be embodied in various forms including a desktop computer, laptop computer, mobile computer, mobile phone, mobile communication device, game device, digital camera/camcorder, audio/video player, television device, radio receiver, digital video recorder, positioning device, any combination thereof, and/or the like. For purposes of illustration but not of limitation, FIG. 2 illustrates a block diagram of one example of a mobile terminal. It should be understood, however, that the mobile terminal illustrated and hereinafter described is merely illustrative of one type of mobile terminal that may implement and/or benefit from embodiments of the present invention and, therefore, should not be taken to limit the scope of the present invention. While one embodiment of the mobile terminal is illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 102 may include an antenna 12 (or multiple antennas) in communication with a transmitter 14 and a receiver 16. The mobile terminal may also include a processor 20 configured to provide signals to and receive signals from the transmitter and receiver, respectively. The processor may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor comprises a plurality of processors. The signals sent and received by the processor may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data Rates for GSM Evolution (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), UTRAN and/or the like. The mobile terminal may be additionally capable of operating in accordance with 3.9G wireless communication protocols such as LTE (E-UTRAN), LTE-Advanced and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TAGS), mobile terminals may also benefit from embodiments of this invention, as should dual or higher mode phones (e.g., digital/analog or TDMA/CDMA/analog phones). Additionally, the mobile terminal 102 may be capable of operating according to Wireless Fidelity (Wi-Fi) or Worldwide Interoperability for Microwave Access (Wi-MAX) protocols.

It is understood that the processor 20 may comprise circuitry for implementing audio/video and logic functions of the mobile terminal 102. For example, the processor may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor may be capable of operating a connectivity program, such as a web browser. The connectivity program may allow the mobile terminal to transmit and receive web content, such as location-based content, according to a protocol, such as Wireless Application Protocol (WAP), hypertext transfer protocol (HTTP), and/or the like. The mobile terminal may be capable of using a Transmission Control Protocol/Internet Protocol (TCP/IP) to transmit and receive web content across the internet or other networks.

The mobile terminal 102 may also comprise a user interface including, for example, an earphone or speaker 24, a ringer 22, a microphone 26, a display 28, a user input interface, and/or the like, which may be operationally coupled to the processor 20. In this regard, the processor may comprise user interface circuitry configured to control at least some functions of one or more elements of the user interface, such as, for example, the speaker, the ringer, the microphone, the display and/or the like. The processor and/or user interface circuitry comprising the processor may be configured to control one or more functions of one or more elements of the user interface through computer program instructions (e.g., software and/or firmware) stored on a memory accessible to the processor (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

The mobile terminal 102 may comprise memory, such as one or more subscriber identity modules (SIMs) 38, universal SIMs (USIMs), removable user identity modules (R-UIMs), and/or the like, which may store information elements related to a mobile subscriber. In addition to the SIM, the mobile terminal may comprise other removable and/or fixed memory. The mobile terminal may include volatile memory 40 and/or non-volatile memory 42. For example, volatile memory may include Random Access Memory (RAM) including dynamic and/or static RAM, on-chip or off-chip cache memory, and/or the like. Non-volatile memory, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory, non-volatile memory may include a cache area for temporary storage of data. The memories may store one or more software programs, instructions, pieces of information, data, and/or the like which may be used by the mobile terminal for performing functions of the mobile terminal. For example, the memories may store instructions which, when executed by the processor, cause the processor to perform the functions described herein. The memories may also comprise an identifier, such as an international mobile equipment identification (IMEI) code, capable of uniquely identifying the mobile terminal.

Figure 3:
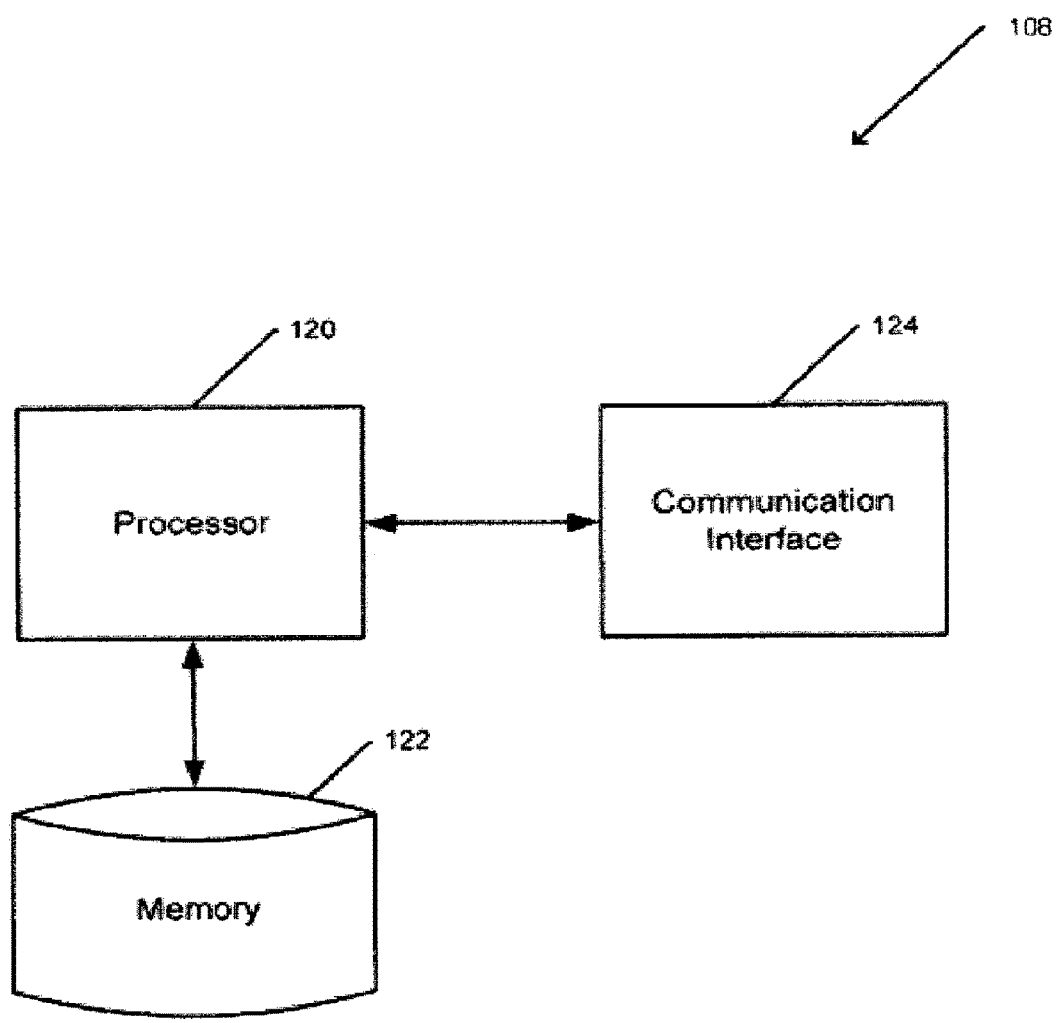
FIG. 3 is a schematic block diagram of a network node, such as a base station system (BSS), of one example embodiment of the present invention.

Referring now to FIG. 3, a block diagram of a network node 104, such as a base station subsystem (BSS), is provided according to an example embodiment of the invention. In the example embodiment illustrated in FIG. 3, the network node may include various means, such as a processor 120, memory 122 and communication interface 124 for performing the various functions herein described. These means of the network node as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example, memory) that is executable by a suitably configured processing device (for example, the processor), or some combination thereof.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, or some combination thereof. Accordingly, although illustrated in FIG. 3 as a single processor, in some embodiments the processor comprises a plurality of processors. The plurality of processors may be in operative communication with each other and may be collectively configured to perform one or more functionalities of the network node 104 as described herein. In an example embodiment, the processor is configured to execute instructions stored in the memory 122 or otherwise accessible to the processor. These instructions, when executed by the processor, may cause the network node to perform one or more of the functionalities of the network node as described herein and depicted, for example, in FIG. 5. As such, whether configured by hardware or software methods, or by a combination thereof, the processor may comprise an entity capable of performing operations according to embodiments of the present invention while configured accordingly. Thus, for example, when the processor is embodied as an ASIC, FPGA or the like, the processor may comprise specifically configured hardware for conducting one or more operations described herein. Alternatively, as another example, when the processor is embodied as an executor of instructions, such as may be stored in the memory, the instructions may specifically configure the processor to perform one or more algorithms and operations described herein.

The memory 122 may comprise, for example, volatile memory, non-volatile memory, or some combination thereof. Although illustrated in FIG. 3 as a single memory, the memory may comprise a plurality of memories. In various embodiments, the memory may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory may be configured to store information, data, applications, instructions, and/or the like for enabling the network node 104 to carry out various functions in accordance with example embodiments of the present invention. For example, in at least some embodiments, the memory is configured to buffer input data for processing by the processor 120. Additionally or alternatively, in at least some embodiments, the memory is configured to store program instructions for execution by the processor. The memory may store information in the form of static and/or dynamic information.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to another entity, such as over a base station controller 108. In at least one embodiment, the communication interface is at least partially embodied as or otherwise controlled by the processor. In this regard, the communication interface may be in communication with the processor, such as via a bus. The communication interface may include, for example, an antenna, a transmitter, a receiver, a transceiver and/or supporting hardware or software for enabling communications with one or more computing devices or entities over the network. The communication interface may be configured to receive and/or transmit data using any protocol that may be used for communications between the network node 104 and one or more other computing devices over the network (e.g., the a service provider, network access point, and/or the like). The communication interface may additionally be in communication with the memory, such as via a bus.

As described below, the mobile terminal 102, such as a processor 20, makes measurements of signal strength, measurements of downlink path loss or the like associated with each CSG cell 110, and then uniquely identifies the CSG cells in any measurement report transmitted to the network node 104. In this regard, the mobile terminal, such as a processor, uniquely identifies the CSG cells as between the respective mobile terminal and the macrocell, but not necessarily on a global basis within the network 106. Accordingly, the mobile terminal, such as a processor, may uniquely identify the CSG cell with an abbreviated identifier in association with a physical layer identity and a frequency of the CSG cell, thereby conserving the signalling resources that must be dedicated to uniquely identifying the CSG cells.

In the embodiment illustrated in FIG. 1, four CSG cells 110, that is, $CSGCell_1$, $CSGCell_2$, $CSGCell_3$ and $CSGCell_4$, are within the coverage area of a common macrocell, such as a GERAN cell. For purposes of explanation, but not of limitation, it will be presumed that $CSGCell_1$, $CSGCell_2$ and $CSGCell_4$ each has the same physical layer identity, e.g., $PSC_1$, and operates on the same frequency, e.g., $f_1$. While $CSGCell_3$ operates on the same frequency, that is, $f_1$, $CSGCell_3$ has a different physical layer identity, that is, $PSC_2$.

Figure 4:
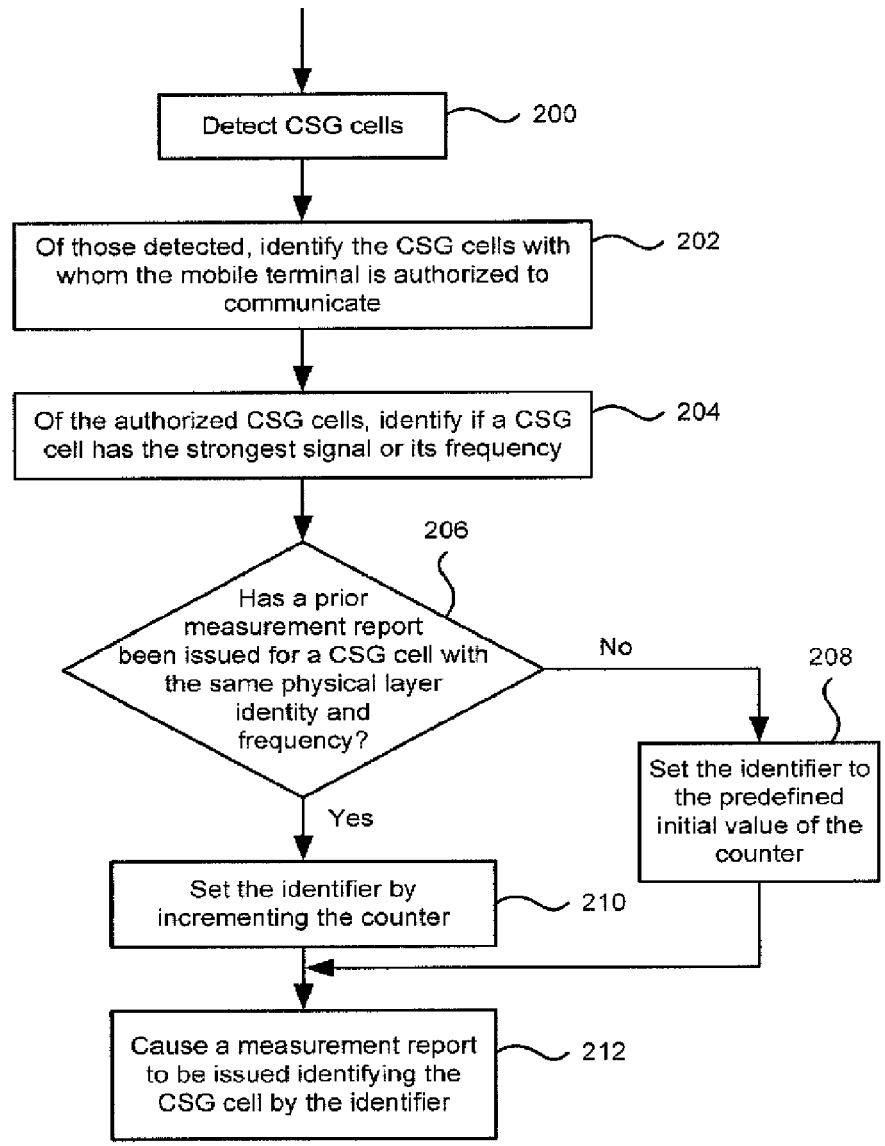
FIG. 4 is a block diagram of operations performed by a mobile terminal in accordance with one example embodiment of the present invention.

As illustrated in operation 200 of FIG. 4, the mobile terminal 102, such as the processor 20, initially communicates with the CSG cells 110 to detect the CSG cells with which the mobile terminal is in communication. In the illustrated embodiment, for example, the mobile terminal may detect each of $CSGCell_1$, $CSGCell_2$, $CSGCell_3$ and $CSGCell_4$. While the mobile terminal may detect multiple CSG cells "at one time", the mobile terminal of one example embodiment is configured to detect a single CSG cell and to then process the single CSG cell as described below and as shown in FIG. 4. The mobile terminal may then identify the CSGs that the mobile terminal is allowed to access. See operation 202. In this regard, the mobile terminal may maintain, such as in memory 42, a listing, such as a whitelist, of the CSGs with which the mobile terminal is authorized to communicate. In the illustrated embodiment, for example, the mobile terminal may be configured to communicate with any of $CSGCell_1$, $CSGCell_2$, or $CSGCell_3$ so long as the CSG of those cells are on the CSG whitelist of the mobile terminal. However, the CSG of $CSGCell_4$ may not be on the CSG whitelist of the mobile terminal and, as a result, the mobile terminal is not authorized to communicate with $CSGCell_4$. Accordingly, even though the mobile terminal may detect $CSGCell_4$, the mobile terminal may not thereafter consider $CSGCell_4$ for purposes of supporting communication with the mobile terminal and will therefore not further analyze the signal strength or other properties of $CSGCell_4$.

Following the detection of a CSG cell 110 and a determination that the CSG of the CSG cell is on the CSG whitelist of the mobile terminal 102, the mobile terminal, such as the processor 20, may determine, for each of the different frequencies, the cell having the strongest measured signal, such as in terms of signal strength, downlink path loss or the like. See operation 204 of FIG. 4. The mobile terminal, such as the processor, may also determine the physical layer identity and the operating frequency of the strongest measured cell. In the example in which $CSGCell_1$ is determined to be the strongest cell on frequency f1, the mobile terminal may identify that $CSGCell_1$ has a physical layer identity of PSC1 and operates on frequency f1. Once the strongest measured cell on a frequency has been determined to be a CSG cell of which the CSG ID is on the CSG whitelist of the mobile terminal, the mobile terminal, such as the processor, prepares to issue a measurement report to the network node to inform the network node of the measurement results for the strongest measured cell. e.g., CSG cell in this case. In this regard, the mobile terminal, such as the processor, may determine if the mobile terminal has reported any other CSG cell (as determined by a CSG cell having a different CGI) having the same physical layer identity and frequency in prior measurement reports to the network node. See operation 208 of FIG. 4.

In instances in which the strongest measured cell is a CSG cell, the mobile terminal 102, such as the processor 20, may then generate an identifier for the respective CSG cell, that is, the strongest measured cell on the frequency. Although the mobile terminal may generate the identifier in a variety of different manners, the mobile terminal of one embodiment generates the identity based upon a counter that is initially set to a predefined initial value, such as zero, and then incremented for each successive and distinct CSG cell having the same physical layer identity and operating on the same frequency. Thus, in instances in which the mobile terminal, such as the processor, determines that the cell having the strongest signal on the frequency is a CSG cell and is the first CSG cell included in the measurement reports that has the respective physical layer identity and that operates on the frequency, the mobile terminal, such as the processor, may assign an identifier of the predefined initial value, such as zero, to the CSG cell. See operation 210. Alternatively, if the mobile terminal, such as the processor, determines that the cell having the strongest signal on the frequency is a CSG cell and is the second CSG cell having the same physical layer identity and operating on the same frequency, the mobile terminal, such as the processor, may increment the counter and then assign this second CSG cell an identifier equal to the incremented counter, e.g., an identifier of 1 for the second CSG cell, and so on. See operation 212. The identifier determined by the mobile terminal and used for a CSG cell can be considered valid until the mobile terminal reuses the identifier for another CSG cell i.e. until the counter has cycled. The mobile terminal, such as the processor, may then cause a measurement report to be issued that identifies the strongest measured CSG cell for each frequency, such as by identifying each CSG cell with its identifier, its physical layer identity and the frequency on which the CSG cell operates, and that contains the measurement results associated with the CSG cell. See operation 214. The measurement report therefore uniquely identifies the CSG cell as between the mobile terminal that issued the measurement report and the macrocell (although not necessarily globally within the network 106) without requiring reference to the CGI, thereby uniquely identifying the CSG cell in a manner that requires substantially fewer bits than the CGI. However, the mobile terminal may maintain a mapping or other association between the identifier generated by the mobile terminal and the CGT so that subsequent reference to the identifier, such as by the network node 104, can be uniquely associated with the respective CGI by the mobile terminal. In the illustrated embodiment in which the mobile terminal has detected $CSGCell_1$ to have the strongest signals on the frequency on which $CSGCell_1$ operates and has not previously issued a measurement report for a CSG cell having the same physical layer identity and operating on the same frequency as $CSGCell_1$, the mobile terminal, such as the processor, may generate a measurement report identifying $CSGCell_1$ by its physical layer identity, such as PSC1, the frequency on which it operates, such as f1, and its identifier, such as zero, and containing the measurement results associated with $CSGCell_1$.

The network node 104, such as the BSS and, more particularly, the processor 120 of the BSS, may receive the measurement report including the identification of the CSG cell having the strongest signal at the frequency at which the CSG cell operates, such as in terms of the physical layer identity of the CSG cell, the frequency at which the CSG cell operates and the identifier generated by the mobile terminal that uniquely identifies the CSG cell as between the mobile terminal 102 that issued the measurement report and the macrocell, although not necessarily globally within the network 106 or between the network and another mobile terminal. See operation 300. As noted above, the measurement reports also generally include measurement results for the CSG cells that are the subject of the report. In this example embodiment, the network node, such as a processor of the BSS, may receive a measurement report identifying $CSGCell_1$ by its physical layer identity, such as PSC1, the frequency on which it operates such as f1, and its identifier, such as zero, generated by the mobile terminal. As noted above, the measurement reports received by the network node may include measurement results for a plurality of different CSG cells and other cells operating on different frequencies in some embodiments. The network node, such as the processor of the BSS, may then determine if a cell change order is to be issued to order the mobile terminal to move to a different cell from the cell currently serving the mobile terminal. See operation 302.

In instances in which the network node 104 does not issue a cell change order, the mobile terminal 102 may continue to identify CSG cells 110 with which it may maintain communication to obtain measurement results for each of these CSG cells. See operations 200 and 202. In instances in which the mobile terminal, such as the processor 20, determines that a different CSG cell now has the strongest signal on the frequency, the mobile terminal may issue another measurement report identifying the CSG cell now having the strongest signal. See operation 204. By way of example, the mobile terminal, such as a processor, may determine that $CSGCell_2$ now has the strongest signal. The mobile terminal, such as the processor, may then determine if the mobile terminal has previously issued a measurement report for another CSG cell having the same physical layer and identity and operating on the same frequency as $CSGCell_2$. Since $CSGCell_1$ and $CSGCell_2$ have the same physical layer identity and operate on the same frequency, the mobile terminal, such as the processor, may generate an identity that differs from $CSGCell_1$ so as to uniquely identify $CSGCell_2$ as between the respective mobile terminal and the macrocell. See operation 208. In the embodiment in which the identifier is represented by a counter, the mobile terminal, such as the processor, may increment the counter upon determining that a different CSG cell having the same physical layer identity and operating on the same frequency has been identified to have the strongest signal. See operation 212. Continuing with the above example in which $CSGCell_1$ was previously assigned an identifier of zero, the mobile terminal, such as the processor, may assign $CSGCell_2$ an identifier of 1 following incrementing of the counter from 0 to 1. The mobile terminal may then cause a measurement report identifying $CSGCell_2$ by its physical layer identity, such as PSC1, the frequency on which it operates, such as f1 and its identifier, such as 1, and containing the measurement results associated with $CSGCell_2$. See operation 214. As before, the measurement report issued by the mobile terminal may also include measurement results and identification information for other CSG cells and other cells operating on other frequencies. As an alternative example, if the mobile terminal had determined that $CSGCell_3$ was now the strongest cell, the mobile terminal need not have incremented the counter associated with the physical layer identity PSC1 and frequency f1 since $CSGCell_3$ has a different physical layer identity than $CSGCell_1$, but, instead, may have assigned $CSGCell_3$ an identifier of zero (assuming that the mobile terminal had not previously issued a measurement report for a CSG cell having the same physical layer identity and operating on the same frequency as $CSGCell_3$), thereby identifying $CSGCell_3$ by its physical layer identity, such as PSC2, the frequency on which it operates, such as f1, and its identifier, such as zero.

The network node 104, such as a processor 120 of the BSS, may again receive the measurement reports that uniquely identify the CSG cell (as between the respective mobile terminal 102 and the macrocell) and provide measurement results for those CSG cells. See operation 300 of FIG. 5. Thus, even though $CSGCell_1$ and $CSGCell_2$ have the same physical layer identity and operate on the same frequency, both the mobile terminal 102 and the network node may uniquely identify the two CSG cells 110 as between themselves based upon the identifier generated by the mobile terminal as well as the physical layer identity and the frequency on which the CSG cells operate. In this regard, unlike the mobile terminal that can specifically identify a CSG cell by its CGI based upon a mapping or other association maintained by the mobile terminal between the CGIs of the various CSG cells and the physical layer identities, operational frequencies and identifiers of the CSG cells, the network node may not be able to identify the CSG cells by their CGIs (since the CGIs or Public Land Mobile Network (PLMN) IDs need not have been provided to the network node), but the network node can uniquely identify a respective CSG cell to the mobile terminal based upon its physical layer identity, operational frequency and identifier.

The network node 104, such as a processor 120 of the BSS, may then again determine if a cell change order is to be issued, such as based upon the measurement results. See operation 302. In instances in which the network node, such as the processor of the BSS, determines that a cell change is to be issued, the network node, such as the processor, may generate a cell change order that identifies the target cell, that is, the cell to which the mobile terminal should move. See operation 304. The network node, such as the processor of the BSS, may then cause a cell change order to be issued to the mobile terminal that identifies the target cell, such as by identifying the physical layer identity of the target cell, the frequency on which the target cell operates and the identity of the target cell as originally generated by the mobile terminal. See operation 306. For example, the network node may generate a cell change order directing the mobile terminal to move to $CSGCell_2$ by issuing a cell change order that identifies $CSGCell_2$ by its physical layer identity, the frequency on which it operates and its identifier, such as 1.

The mobile terminal 102, such as the processor 20, may receive the cell change order and may uniquely identify the target cell based upon the physical layer identity, the frequency on which the target cell operates and the identifier that had been originally generated by the mobile terminal and which uniquely identifies the CSG cell as between the mobile terminal and the macrocell. The mobile terminal, such as the processor, may then carry out the cell change order by moving to the target cell, such as $CSGCell_2$, to support subsequent communications. The mobile terminal, such as the processor, may then continue with the identification of CSG cells with which the mobile terminal may communicate and may provide measurement results to the network node 104 based on any relative changes in signal strength for the CSG cells operating at the various frequencies, as described above in conjunction with FIG. 4.

As noted above, the mobile terminal 102, such as the processor 20, of one example embodiment may generate an identifier based upon the incrementing of a counter in instances in which the mobile terminal has previously issued a measurement report to the network node 104 for a CSG cell 110 having the same physical layer identity and operating on the same frequency. As such, the mobile terminal, such as the processor, will not generally increment the counter in instances in which a CSG cell that is to be the subject of a measurement report, such as $CSGCell_3$, has either a different physical layer identity, such as PSC2, operates on a different frequency, such as f2, or both. Instead, the mobile terminal, such as a processor, may identifier of 0 in the first alternative and does not include an identifier in the second alternative.

| PSC | Freq | CSG Cell (Y/N) | CGI | CSG "Whitelist" (Y/N) | Strongest on freq (Y/N) | identifier Y/N | Value | Remarks |
|---|---|---|---|---|---|---|---|---|
| x | X | N | x | N/A | N/A | N | N/A | Macro cell |
| x | X | Y | x | N | N/A | N | N/A | Not reported (not allowed cell) |
| x | X | Y | x | Y | N | N | N/A | Not reported (allowed cell, but not strongest cell) |
| $PSC_1$ | $f_1$ | Y | $CGI_1$ | Y | Y | Y | '0' | Reported first time - First alternative |
|  |  |  |  |  |  | N | N/A | Reported first time - Second alternative |
| $PSC_1$ | $f_1$ | Y | $CGI_2$ | Y | Y | Y | '1' | Potential PSC confusion. $2^{nd}$ reported CSG cell for $\{PSC_1, f_1\}$- First alternative |
|  |  |  |  |  |  | Y | '0' | Potential PSC confusion. $2^{nd}$ reported CSG cell for $\{PSC_1, f_1\}$- Second alternative |
| $PSC_2$ | $f_1$ | Y | $CGI_3$ | Y | Y | Y | '0' | Reported first time - First alternative |
|  |  |  |  |  |  | N | N/A | Reported first time - Second alternative |
| $PSC_1$ | $f_1$ | Y | $CGI_4$ | Y | Y | Y | '2' | Potential PSC confusion. $3^{rd}$ reported CSG cell for $\{PSC_1, f_1\}$ - First alternative |
|  |  |  |  |  |  | Y | '1' | Potential PSC confusion. $3^{rd}$ reported CSG cell for $\{PSC_1, f_1\}$ - Second alternative |

NOTE:
"x" represents any value maintain a separate set of identifiers, such as based on different counters, for each different combination of physical layer identity and frequency.

Although still based upon a counter, the mobile terminal 102, such as the processor 20, may generate unique identifiers for the CSG cells in other manners. For example, the mobile terminal of the preceding embodiment identified the first CSG cell having a certain physical layer identity and operating on a certain frequency with an identifier of 0. Alternatively, the mobile terminal, such as the processor, may identify the first CSG cell having a certain physical layer identity and operating on a certain frequency that is to be the subject of a measurement report by the absence of an identifier, that is, the resulting measurement report will not include an identifier for the respective CSG cell. However, the mobile terminal, such as the processor, of this embodiment may identify the next CSG cell having the same physical layer identity and operating on the same frequency by an identifier of zero, the following CSG cell having the same physical layer identity and operating on the same frequency by an identifier of one and so on. By identifying the first CSG cell having a certain physical layer identity and operating on a certain frequency without an identifier, the mobile terminal of this embodiment may further conserve the signalling requirements that are dedicated to uniquely identifying the CSG cell, while still permitting the CSG cells to be uniquely identified as between the mobile station and the macrocell.

Figure 6:
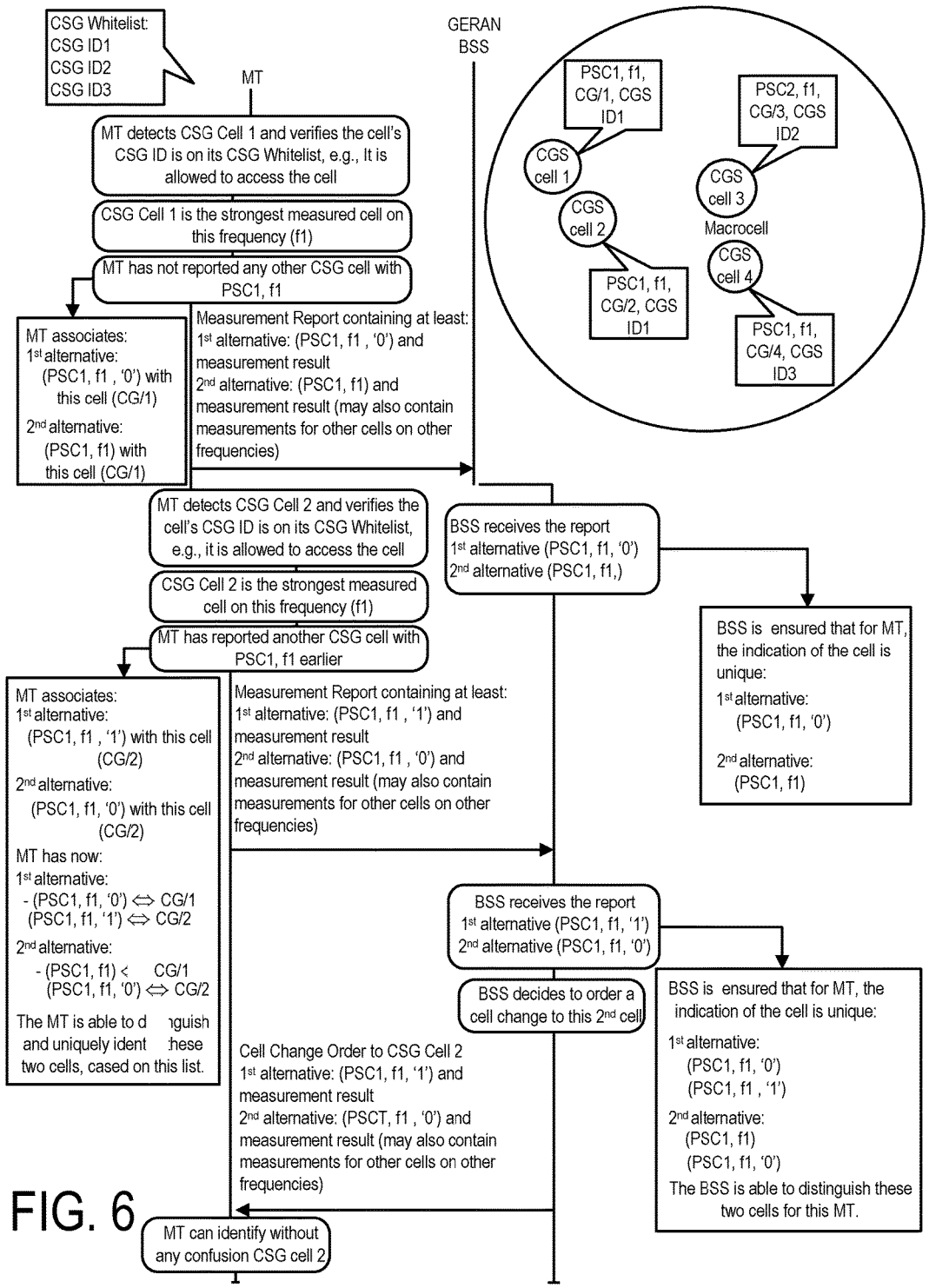
FIG. 6 is another flowchart of operations performed by a mobile terminal and a BSS in accordance with an example embodiment of the present invention.

As a further example of the operation of example embodiments of the present invention, the following table illustrates the identifier that is generated by the mobile terminal 102 in various scenarios. In this regard, it is noted that the first and second alternatives referenced by the following table correspond to the embodiments described above in which the first CSG cell that is the subject of a measurement report has an By way of further illustration, FIG. 6 provides another illustration of the foregoing example embodiment in which the mobile terminal (MT) 102 initially detects and issues a measurement report for CSGCell1 and thereafter detects and issues a measurement report for CSGCell2. Following receipt of the measurement report for CSGCell2, the network node 104 issues a call change order to CSGCell2. As noted above, the first and second alternatives referenced in FIG. 6 correspond to the embodiments described above in which the first CSG cell that is the subject of a measurement report has an identifier of 0 in the first alternative and does not include an identifier in the second alternative.

In an alternative embodiment, the mobile terminal 102, such as the processor 20, may generate a different identifier for each different CSG cell 110 that is the subject of a measurement report (such as a counter that is incremented for each different CSG cell 110 that is the subject of a measurement report), regardless of the physical layer identities and operational frequencies of the CSG cells, that is, regardless of whether the physical layer identities and operational frequencies of the CSG cells are the same or different. By way of example, the mobile terminal may issue a first measurement report for $CSGCell_1$ having a physical layer identity of PSC1, a frequency of f1 and an identifier of 0. Thereafter, the mobile terminal may issue a second measurement report for $CSGCell_2$ having an identifier of 1 even if the physical layer identity and/or the frequency of $CSGCell_2$ is different than that $CSGCell_1$. For example, the second measurement report for $CSGCell_2$ may have an identifier of 1 in this embodiment even though the physical layer identity is PSC2 and the frequency is f2.

The mobile terminal 102 and network node 104 are generally configured to define a field of a predetermined number of bits in which to uniquely identify the CSG cells 110 as between the mobile station and the macrocell served by the network node. The size of the field is generally set to be sufficiently large so as to allow each of the different CSG cells that are anticipated to be identified while the mobile terminal remains within packet transfer mode or while the mobile terminal is served by the macrocell. In one embodiment, for example, the field may be set to be 3 bits, thereby permitting 8 CSG cells to be uniquely identified as between the mobile terminal and the macrocell for each combination of physical layer identity and frequency (or 9 CSG cells in the embodiment in which the initial CSG cell is not assigned an identifier). In other words, utilization of a field set to 3 bits permits 8 CSG cells to be uniquely identified as between the mobile terminal and the macrocell in instances in which the initial CSG cell is assigned an identifier (or 9 CSG cells in the embodiment in which the initial CSG cell is not assigned an identifier). While the field is large enough to uniquely identify the CSG cells within the macrocell, the field is still generally much smaller than that required for a globally unique identifier in the network, such as the CGI.

Methods and apparatus of other embodiments may uniquely identify the CSG cells 110 in other manners. For example, the mobile terminal 102, such as the processor 20, may associate an identifier not with a physical layer identity and a frequency as described above, but, instead, with the measurement report to the network node 104. In this embodiment, the identifier, when combined with the physical layer identity and the frequency of a CSG cell included in a report, will uniquely identify the CSG cell between the mobile terminal and the network node within the scope of the particular report, such as a particular measurement report. Although the method and apparatus of this embodiment allows the network node and the mobile terminal to maintain explicit track of report messages containing CSG cells, the method and apparatus of this embodiment cannot distinguish CSG cells between different reports as the identifier does not uniquely identify individual CSG cells, but only report messages.

As described above FIGS. 4 and 5 are flowcharts of an apparatus, method, and computer program product according to exemplary embodiments of the invention. As also described above, each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product that is performed by the mobile terminal 102 in accordance with FIG. 4 may be stored by one or more memory devices 40, 42 of the mobile terminal and executed by the processor 20 of the mobile terminal. Similarly, the computer program product that is performed by the network node 104 in accordance with FIG. 5 may be stored by one or more memory devices 122 of the network node and executed by the processor 120 of the network node. In some embodiments, the computer program instructions comprising the computer program product(s) which embody the procedures described above may be stored by memory devices of a plurality of computing devices, such as the mobile terminal and/or the network node. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (e.g., the mobile terminal, network node or the like) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions for performing the specified functions. It will also be understood that one or more blocks of the flowchart, and combinations of blocks in the flowchart, may be implemented by special purpose hardware-based computer systems which perform the specified functions or combinations of special purpose hardware and computer program product(s).

Figure 5:
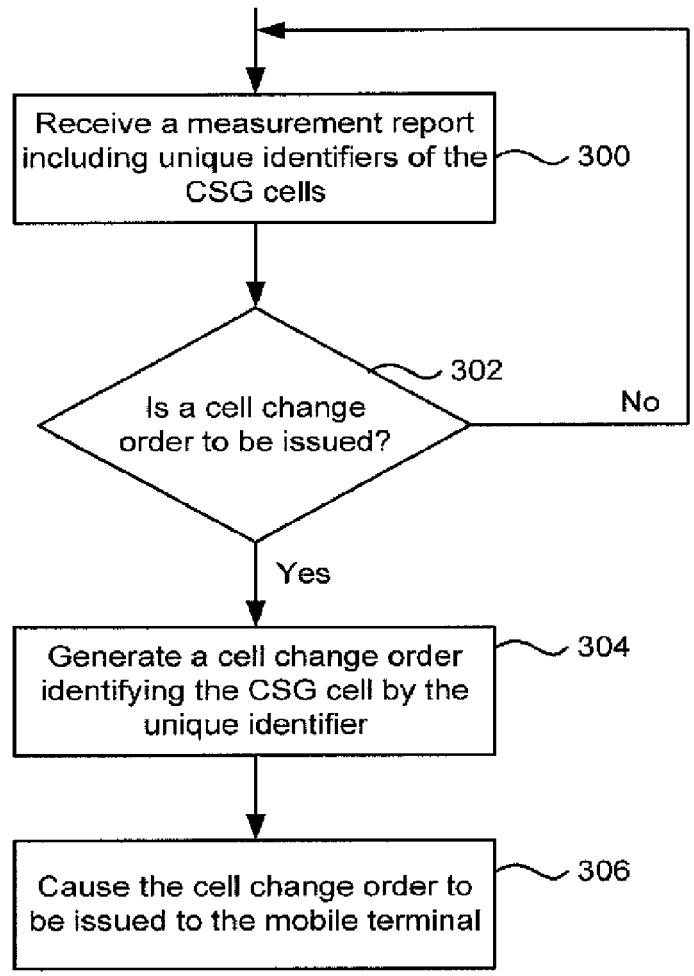
FIG. 5 is a flowchart of operations performed by a BSS in accordance with one example embodiment of the present invention.

The above described functions may be carried out in many ways. For example, any suitable means for carrying out each of the functions described above may be employed to carry out embodiments of the invention. In one embodiment, suitably configured processors 20, 120 of the mobile terminal 10 and the network node 104, respectively, may provide means for performing their respective functions, as shown in FIGS. 4 and 5 and described above. In another embodiment, all or a portion of the operations, such as shown in FIGS. 4 and 5, may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these embodiments pertain having the benefit of the teachings presented in the foregoing description and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A method comprising:
   detecting, by a mobile terminal, a closed subscriber group cell;

generating, by the mobile terminal, an identifier identifying the closed subscriber group cell, wherein the identifier is generated locally at the mobile terminal to provide an abbreviated identifier rather than using a cell global identifier to identify the closed subscriber group cell; and transmitting, by the mobile terminal and to a macrocell, the identifier, a physical layer identity of the closed subscriber group cell, and a measurement report including a frequency of the closed subscriber group cell, wherein the identifier, the physical layer identity of the closed subscriber group cell, and the frequency of the closed subscriber group cell allows the closed subscriber group cell to be identified between the mobile terminal and the macrocell.

2. A method according to claim 1, wherein generating the identifier comprises generating a different identifier for each closed subscriber group cell having the same physical layer identity and frequency.

3. A method according to claim 1, wherein there is a finite set of different identifiers that can be generated, wherein the identifier is valid in the mobile terminal for a given closed subscriber group cell at most until it is reused for a different closed subscriber group cell having the same physical layer identity and frequency.

4. The method of claim 1, wherein the abbreviated identifier has a length in bits less than the cell global identifier for the closed subscriber group cell.

5. An apparatus comprising:
at least one processor; and
at least one memory including computer program code, the at least one memory and the computer program code configured to, with the at least one processor, cause the apparatus to at least:
detect, by the apparatus, a closed subscriber group cell;
generate, by the apparatus, an identifier identifying the closed subscriber group cell, wherein the identifier is generated locally at the apparatus to provide an abbreviated identifier rather than using a cell global identifier to identify the closed subscriber group cell; and
transmit, by the apparatus and to a macrocell, the identifier, a physical layer identity of the closed subscriber group cell, and a measurement report including a frequency of the closed subscriber group cell, wherein the identifier, the physical layer identity of the closed subscriber group cell, and the frequency of the closed subscriber group cell allows the closed subscriber group cell to be identified between the apparatus and the macrocell.

6. An apparatus according to claim 5, wherein the apparatus is further configured to at least generate a different identifier for each closed subscriber group cell having the same physical layer identity and frequency.

7. An apparatus according to claim 5, wherein the apparatus is further configured to at least generate a finite set of different identifiers, wherein the identifier is valid in the apparatus for a given closed subscriber group cell at most until it is re-used for a different closed subscriber group cell having the same physical layer identity and frequency.

8. An apparatus according to claim 5, wherein the apparatus is configured to at least generate the identifier by generating a different identifier for each different combination of physical layer identity and frequency.

9. An apparatus according to claim 5, wherein the apparatus is further configured to at least identify one closed subscriber group cell from among the closed subscriber group cells having a respective combination of physical layer identity and frequency by a lack of the identifier.

10. An apparatus according to claim 5, wherein the apparatus is further configured to at least maintain a mapping of the identifier to a cell global identifier of the respective closed subscriber group cell.

11. A non-transitory computer-readable medium including computer program code which when executed by at least one processor causes operations comprising:
detecting, by a mobile terminal, a closed subscriber group cell;
generating, by the mobile terminal, an identifier identifying the closed subscriber group cell, wherein the identifier is generated locally at the mobile terminal to provide an abbreviated identifier rather than using a cell global identifier to identify the closed subscriber group cell; and
transmitting, by the mobile terminal and to a macrocell, the identifier, a physical layer identity of the closed subscriber group cell, and a measurement report including a frequency of the closed subscriber group cell, wherein the identifier, the physical layer identity of the closed subscriber group cell, and the frequency of the closed subscriber group cell allows the closed subscriber group cell to be identified between the mobile terminal and the macrocell.

12. A method comprising:
receiving, at a macrocell and from a mobile terminal, an identifier, a physical layer identity of a closed subscriber group cell, and a measurement report including a frequency of the closed subscriber group cell, the identifier being generated by the mobile terminal to provide an abbreviated identifier when compared to a cell global identifier; and
identifying a respective closed subscriber group cell based upon the identifier, the physical layer identity of the closed subscriber group cell, and the frequency of the closed subscriber group cell, wherein the identifier, the physical layer identity of the closed subscriber group cell, and the frequency of the closed subscriber group cell allows the closed subscriber group cell to be identified between the mobile terminal and the macrocell, but not more globally nor between another mobile terminal and the macrocell.

13. A method according to claim 12, wherein the mobile terminal maps the identifier to a cell global identifier for the closed subscriber group cell.

14. A method according to claim 12, further comprising causing a cell change order to be issued that identifies the respective closed subscriber group cell by the identifier, the physical layer identity of the closed subscriber group cell, and the frequency of the closed subscriber group cell.

15. An apparatus comprising:
at least one processor and at least one memory including computer program code, the at least one memory and the computer program code configured to, with the at least one processor, cause the apparatus to at least:
receive, from a mobile terminal, an identifier, a physical layer identity of a closed subscriber group cell, and a measurement report including a frequency of the closed subscriber group cell, the identifier being generated by the mobile terminal to provide an abbreviated identifier when compared to a cell global identifier; and
identify a respective closed subscriber group cell based upon the identifier, the physical layer identity of the closed subscriber group cell, and the frequency of the closed subscriber group cell, wherein the identifier, the physical layer identity of the closed subscriber group cell, and the frequency of the closed subscriber group cell allows the closed subscriber group cell to be identified between the mobile terminal and the apparatus, but not more globally nor between another mobile terminal and the apparatus.

16. An apparatus according to claim 15, wherein the mobile terminal maps the identifier to the cell global identifier for the closed subscriber group cell.

17. An apparatus according to claim 15, wherein the apparatus is further configured to at least cause a cell change order to be issued that identifies the respective closed subscriber group cell by the identifier, the physical layer identity of the closed subscriber group cell, and the frequency of the closed subscriber group cell.

18. A non-transitory computer-readable medium including computer program code which when executed by at least one processor causes operations comprising:

receiving, at a macrocell and from a mobile terminal, an identifier, a physical layer identity of a closed subscriber group cell, and a measurement report including a frequency of the closed subscriber group cell, the identifier being generated by the mobile terminal to provide an abbreviated identifier when compared to a cell global identifier; and identifying a respective closed subscriber group cell based upon the identifier, the physical layer identity of the closed subscriber group cell, and the frequency of the closed subscriber group cell, wherein the identifier, the physical layer identity of the closed subscriber group cell, and the frequency of the closed subscriber group cell allows the closed subscriber group cell to be identified between the mobile terminal and the macrocell, but not more globally nor between another mobile terminal and the macrocell.

* * * * *